United States Patent [19]

Mitsui et al.

[11] Patent Number: 5,082,820
[45] Date of Patent: Jan. 21, 1992

[54] CARRIER FOR GAS-TREATING CATALYST, METHOD FOR PRODUCTION THEREOF AND GAS-TREATING CATALYST INCORPORATING SAID CARRIER THEREIN

[75] Inventors: Kiichiro Mitsui, Akashi; Tooru Ishii, Himeji; Kuinio Sano, Ako; Akira Inoue, Hirakata, all of Japan

[73] Assignee: Nippon Shokubai Kagaku Kogyo Co., Ltd., Osaka, Japan

[21] Appl. No.: 441,375

[22] Filed: Nov. 27, 1989

[30] Foreign Application Priority Data

Nov. 25, 1988 [JP] Japan .................................. 63-296023
Nov. 28, 1988 [JP] Japan .................................. 63-298297

[51] Int. Cl.⁵ .............................................. B01J 21/06
[52] U.S. Cl. .................................. 502/350; 502/349; 502/439; 502/524
[58] Field of Search ............... 502/349, 350, 439, 524, 502/527; 423/593, 608

[56] References Cited

U.S. PATENT DOCUMENTS

| | | | |
|---|---|---|---|
| 3,334,962 | 8/1967 | Clearfield | 502/349 |
| 3,830,756 | 8/1974 | Sanchez et al. | |
| 4,048,112 | 9/1977 | Matsushita et al. | 423/213.2 |
| 4,093,543 | 6/1978 | Rodewald et al. | 210/59 |
| 4,537,873 | 8/1985 | Kato et al. | 502/349 |
| 4,751,005 | 6/1988 | Mitsui et al. | 502/349 |
| 4,753,902 | 6/1988 | Ketcham | 501/128 |

FOREIGN PATENT DOCUMENTS

| | | | |
|---|---|---|---|
| 143838 | 8/1983 | Japan | 502/350 |
| 260721 | 11/1987 | Japan | 502/349 |
| 23739 | 2/1988 | Japan | 502/349 |

OTHER PUBLICATIONS

Chem Abstract. Dtatabase WPLI, 83-779760, Derwent Publications, Ltd. EPO Search Report EP 89 12 1746.

*Primary Examiner*—Anthony McFarlane
*Attorney, Agent, or Firm*—Omri M. Behr

[57] ABSTRACT

A carrier for a waste gas-treating catalyst, comprising an inorganic refractory oxide containing a composite oxide of titanium and zirconium possessing a crystalline structure of $ZrTiO_4$, which is produced by heat-treating a substance containing a titanium compound and a zirconium compound at a temperature in the range of 600° to 1,000° C., and a catalyst for treatment of a waste gas comprising the carrier deposited a catalytically active component.

13 Claims, No Drawings

CARRIER FOR GAS-TREATING CATALYST, METHOD FOR PRODUCTION THEREOF AND GAS-TREATING CATALYST INCORPORATING SAID CARRIER THEREIN

BACKGROUND OF THE INVENTION

1. Field of the Invention

This invention relates to a carrier for a waste gas-treating catalyst, a method for the production of the carrier, and a waste gas-treating catalyst incorporating the carrier therein. More particularly, it relates to a thermally stable and chemically stable carrier for a waste gas-treating catalyst, a method for the production of the carrier, and a catalyst incorporating the carrier therein and used for effecting complete oxidation of a waste gas containing such combustible gases as noxious and odorous organic compounds and carbon monoxide and defecting the waste gas of such harmful substances, a catalyst for cleaning a waste gas emanating from an internal combustion engine, or a catalyst for removing nitrogen oxides (hereinafter occasionally referred to as "$NO_x$") from a waste gas emanating from a varying industrial process using a boiler, a gas turbine, or a heating furnace by causing catalytic reaction of ammonia upon the nitrogen oxides.

2. Description of the Prior Art

In recent years, organic solvent type waste gases emanating such as from printing, coating, and resin processing plants, odorous waste gases arising from refuse incinerating furnaces, scrap preheating furnaces, etc., and organic plant waste gases issuing from petrochemical plants have been causing a hygienic problem from the environmental point of view. The purification of these waste gases, therefore, constitutes an urgent task for the prevention of environmental pollution.

As means of purifying these waste gases, the method of direct combustion, the method of adsorption with activated carbon, and the method of catalytic oxidation, for example, have been practiced heretofore in the case of organic solvent type waste gases.

In the method resorting to the catalytic oxidation, the catalyst to be employed uses a carrier made of activated alumina or cordierite.

The method resorting to direct combustion, for example, has the possibility of inducing secondary environmental pollution as by secondary production of nitrogen oxides in addition to necessitating heating at an elevated temperature and incurring high cost of fuel. The method resorting to adsorption entails complicate operations in regeneration, replacement, etc. of the adsorbent and fails to fit the treatment of a waste gas of high concentration in terms of running cost. In contrast, the method resorting to catalytic oxidation is characterized by effecting combustion and decomposition of organic components on a catalyst at a relatively low temperature and enjoying a low cost of fuel and only sparing susceptibility to secondary production of nitrogen oxides. Moreover, this method can be expected to enjoy recovery of the heat owing to the combustion of combustible substances in the waste gas.

The conventional carrier made of activated alumina or cordierite, however, has a weak point that it has the strength thereof degraded by sulfur oxides. Further, the activated has a problem that it is deficient in thermal stability and the cordierite has a disadvantage that the catalyst must be applied in the form of a coating to the surface of a carrier because this substance is deficient in specific surface area. One catalyst uses a carrier of a titania type composite oxide for the purpose of enhancing the durability to resist acidic substances. It is not sufficient satisfactory, however, from the standpoint of thermal resistance such as irreversible thermal shrinkage.

The methods for the removal of nitrogen oxides from waste gases are broadly classified under the method of adsorption, the method of absorption, and the method of catalytic reduction. Among other methods mentioned above, the method of catalytic reduction abounds in ability to treat waste gas, has no use for the otherwise inevitable treatment of waste water, and proves to be advantageous technically and economically.

The method of catalytic reduction is available in two types, i.e. the method of non-selective reduction using a hydrocarbon such as methane or LPG, hydrogen, or carbon monoxide as a reducing agent and the method of selective reduction using ammonia as a reducing agent. The latter method proves to be a very advantageous way of removing nitrogen oxides because it is capable of selectively removing nitrogen oxides from a waste gas containing oxygen in a high concentration and is economical in respect that the consumption of the reducing agent in the operation is small.

The catalysts of the class used in the largest amount in commercial operations have carriers of titanium oxide. The catalyst formed of an oxide of the combination of titanium with vanadium, tungsten, molybdenum, and iron or the catalyst formed of the oxide partly incorporating therein a sulfate, for example, not only keeps its activity in the reduction of nitrogen oxides unaffected by $SO_x$, oxygen, carbon dioxide, and steam which coexist in the waste gas but also exhibits a desirable activity as compared with the catalyst having activated alumina as a substrate and excels also in acidproofness. This catalyst, therefore, predominates among the catalysts which are used in the method of selective catalytic reduction using ammonia as a reducing agent.

The catalysts which use carriers of titanium oxide as mentioned above, however, are deficient in resistance to heat. The inventors have experimentally confirmed that when this catalyst is continuously used at temperatures in the range of 300° to 400° C., the carrier thereof suffers from a decrease of its specific surface area and sustains crystallization of its composition. This catalyst, therefore, has a disadvantage that the catalytic activity thereof is degraded by use. The catalyst to be used for the removal of nitrogen oxides from the waste gas of the kind under discussion is required to possess a quality such that the resistance thereof to heat excels that of the conventional catalyst.

The nitrogen oxide-containing waste gas emanating from a gas turbine, a steel making open-hearth furnace, or a glass melting furnace, for example, has high temperatures in the range of 500° to 600° C. The waste gas emanating from an ordinary boiler under certain conditions has high temperatures exceeding the level of 400° C.

An object of this invention, therefore, is to provide a novel carrier for use in a catalyst for the treatment of a waste gas, a method for the production of the carrier, and a waste gas-treating catalyst incorporating the carrier.

Another object of this invention is to provide a carrier for a waste gas-treating catalyst which possesses thermal stability and chemical stability, the qualities indispensable for the carrier in withstanding the impacts of the waste gas treatment, a method for the production of the carrier, and a catalyst incorporating therein the carrier and effecting complete oxidation of a waste gas containing noxious or odorous organic compounds and such combustible compounds as carbon monoxide and attaining purification of the waste gas by removal of such harmful substances therefrom.

Yet another object of this invention is to provide a carrier exhibiting high resistance to heat, accomplishing effective removal of nitrogen oxides at working temperatures in a wide range as compared with the conventional countertype, and retaining physical and chemical stability intact for a long time and a catalyst incorporating the carrier therein.

SUMMARY OF THE INVENTION

The objects described above are accomplished by a carrier for use in a waste gas-treating catalyst, which carrier is formed of an inorganic refractory oxide containing a composite oxide of titanium and zirconium possessing a crystalline structure of $ZrTiO_4$.

The objects are also accomplished by a method for the production of a carrier for use in a waste gas-treating catalyst, which method comprises heat-treating a substance containing a titanium compound and a zirconium compound at a temperature in the range of 600° to 1,000° C. thereby forming a composite oxide of titanium and zirconium possessing a crystalline structure of $ZrTiO_4$.

The objects are further accomplished by a catalyst for the treatment of a waste gas, characterized by having deposited on a carrier formed of an inorganic refractory oxide containing a composite oxide of titanium and zirconium possessing a crystalline structure of $ZrTiO_4$ at least one metal selected from the group consisting of manganese, iron, chromium, vanadium, molybdenum, cerium, cobalt, nickel, tungsten, copper, tin, silver, gold, platinum, palladium, rhodium, ruthenium, and iridium or a compound thereof.

The objects are further accomplished by a method for the treatment of a waste gas by the application of treatment to the waste gas in the presence of a catalyst for the treatment of a waste gas, characterized by having deposited on a carrier formed of an inorganic refractory oxide containing a composite oxide of titanium and zirconium possessing a crystalline structure of $ZrTiO_4$ at least one metal selected from the group consisting of manganese, iron, chromium, vanadium, molybdenum, cerium, cobalt, nickel, tungsten, copper, tin, silver, gold, platinum, palladium, rhodium, ruthenium, and iridium or a compound thereof.

EXPLANATION OF THE PREFERRED EMBODIMENT

The carrier according with the present invention is characterized by containing a binary composite oxide of titanium and zirconium possessing a crystalline structure of $ZrTiO_4$.

It is widely known as reported in Kozo Tabe, "Catalyst," Vol. 17, No. 3, page 72 (1975) that the binary composite oxide of titanium and zirconium is known as a solid acid and generally exhibits notable acidproofness not observed in either of the component oxides making up the composite oxide.

The composite oxide is not a mere mixture of titanium oxide with zirconium oxide. There are indications that the composite oxide is enabled to manifest its peculiar physical properties because titanium and zirconium jointly form what is called a binary composite oxide. On analysis by the X-ray diffraction, this composite oxide fired at a low temperature is found to possess an amorphous or substantially amorphous microfine structure.

We have found that a composite oxide of titanium and zirconium possessing a crystalline structure of $ZrTiO_4$ can be formed by heating a mixture of a titanium compound with a zirconium compound at a temperature in the range of 600° to 1,000° C., preferably 660° to 900° C., and that this composite oxide constitutes an excellent component for a carrier for the treatment of a waste gas.

The carrier containing this composite oxide of titanium and zirconium possessing a crystalline structure of $ZrTiO_4$ is desired to be produced by a method which comprises heat-treating a substance containing a titanium compound and a zirconium compound at a temperature in the range of 600° to 1,000° C., preferably 660° to 900° C.

If the temperature of the heat treatment is less than 600° C., the produced composite oxide is not vested sufficiently with the crystalline structure of $ZrTiO_4$. If this temperature exceeds 1,000° C., the oxide is deficient notably in specific surface area and deficient also in moldability and strength of the carrier.

The substance which contains a titanium compound and a zirconium compound as described above is preferable to be produced by a process of coprecipitation, though it may be formed by a process of mixing or a process of impregnation, for example. This is because the compounds of titanium and zirconium formed by the process of coprecipitation are obtained in an intimately compacted state. This substance can be transformed by the heat treatment described above into a wholly uniform carrier capable of manifesting the characteristic properties sufficiently.

Incidentally, the substance $ZrTiO_4$ can be identified by X-ray diffraction (McClune, W. F. etc., "1982 Powder Diffraction File, Inorganic Phases, Alphabetical Index," JCPDS International Center for Diffraction Data, Pennsylvania, 1982).

In the carrier of this invention for the waste gas-treating catalyst, the proportion to the carrier of the composite oxide of titanium and zirconium possessing the crystalline structure of $ZrTiO_4$ is preferable to be not less than 10% by weight, preferably not less than 20% by weight, for the sake of the performance of the carrier.

The carrier component gives results preferable for the purpose of imparting excellent durability, moldability of carrier, and strength when the composition thereof is such that the $TiO_2$ content falls in the range of 20 to 90 mol % and the $ZrO_2$ content in the range of 80 to 10 mol %. More desirable results are obtained when the $TiO_2$ content is in the range of 30 to 80 mol % and the $ZrO_2$ content in the range of 70 to 20 mol %.

The carrier may be formed of the combination of the composite oxide of titanium and zirconium possessing the crystalline structure of $ZrTiO_4$ with oxides of such rare earth elements as lanthanum and neodymium, and titania and zirconia.

The carrier and the catalyst of the present invention are preferable to have the specific compositions described above. The forms which can be adopted for the carrier and consequently for the catalyst include pellets, beads, rings, saddles, fine particles, fractured particles, a honeycomb, and other similar articles of monolithic structure, for example.

Further, the above-mentioned specified composition deposited on a shaped body such as α-alumina, mullite, etc., may be adopted.

It has been found that particularly when the carrier containing the composite oxide of titanium and zirconium possessing the crystalline structure of $ZrTiO_4$ is produced in the form of a honeycomb among other forms mentioned above, it is sparingly susceptible of change in crystalline structure or loss of volume due to the impact of heat and, therefore, enjoys many advantages fit for the carrier for a waste gas-treating catalyst. The carrier in the form of a honeycomb fulfils the important conditions of heat, i.e. sparing change in size due to heat, high resistance to heat, and high durability to resist thermal shock. This means that the carrier is capable of withstanding repetitions of sudden rise and fall of temperature during the course of startup of operation and impact of a continuous reaction at elevated temperatures. Further, since the honeycomb carrier exhibits high chemical stability to resist the action of such acidic substances as sulfur oxides contained more often than not in the waste gas and possesses a large BET specific surface area, it performs excellently for the carrier for a waste gas-treating catalyst. Particularly, in the catalyst for the removal of nitrogen oxides, since the catalytic activity thereof is affected greatly by the BET specific surface area, the high resistance to heat which characterizes the carrier of this invention brings about a desirable influence on the durability of the catalyst.

The shape of this honeycomb carrier is desired to be such that the perforations formed therein have an equivalent diameter in the range of 1.5 to 12 mm, preferably 2 to 8 mm, and an opening ratio in the range of 60 to 90%, preferably 60 to 80%. If the equivalent diameter is less than 1.5 mm, the honeycomb carrier suffers from heavy pressure loss and, particularly when the waste gas under treatment contains dust, it tends to entail clogging. If the equivalent diameter exceeds 12 mm, the honeycomb carrier experiences a decrease in the geometric surface area and fails to impart a high activity to the catalyst incorporating this carrier though the pressure loss is decreased and the possibility of clogging is diminished. If the opening ratio exceeds 90%, there is a disadvantage that the carrier is deficient in mechanical strength in spite of the advantage that the pressure loss is slight and the weight of the carrier is small. If the opening ratio is less than 60%, while the honeycomb carrier possesses sufficient mechanical strength, it experiences so heavy pressure loss as to unfit itself for the waste gas treatment which treasures back pressure. Since the honeycomb carrier fulfilling the aforementioned conditions on shape, therefore, possesses sufficient mechanical strength and sufficient geographical surface area and enjoys the aforementioned thermal stability and chemical stability as contributory factors, it excels in durability, enjoys low pressure loss, and retains its high performance over a long time without inducing clogging even when the waste gas under treatment contains dust.

The honeycomb type carrier for a waste gas-treating catalyst of this invention is preferable to be produced by a method which comprises heat treating a substance containing a titanium compound and a zirconium compound at a temperature in the range of 600° to 1,000° C., preferably 660° to 900° C. thereby preparing a powder containing a substance issuing from the formation of a composite oxide of titanium and zirconium possessing a crystalline structure of $ZrTiO_4$ and molding the powder in the shape of a honeycomb. Since the composite oxide undergoes a change in volume during the formation of the crystalline structure of $ZrTiO_4$, the heat treatment is carried out prior to the molding of the powder for the purpose of rendering the molded powder sparingly susceptible of cracking or shrinkage.

For the catalyst to be advantageously used in this invention, the ratio of the components of the catalyst is required to be such that the carrier component accounts for a proportion in the range of 70 to 99.99% by weight, preferably 80 to 99.99% by weight, as oxide and the catalyst component for a proportion in the range of 30 to 0.01% by weight, preferably 20 to 0.01% by weight, as a metal or compound thereof. If the proportion of the catalytic component is less than 0.01% by weight, the catalyst is deficient in the efficiency of purification of waste gas.

In the elements of which the catalyst component is composed, at least one element selected from the group consisting of manganese, iron, chromium, vanadium, molybdenum, cerium, cobalt, nickel, tungsten, copper, tin, and silver is used in an amount in the range of 0 to 30% by weight, preferably 0 to 20% by weight as a compound (oxide, for example), and at least one element selected from the group consisting of gold, platinum, palladium, rhodium, ruthenium, and iridium in an amount in the range of 0 to 10% by weight, preferably 0 to 5% by weight as metal (providing that the total amount of the two elements should be in the range of 30 to 0.01% by weight). The total amount of the carrier component and the catalyst component is 100% by weight. If the amount of the catalyst component is less than the lower limit of the range mentioned above, the catalyst has no sufficient activity in the treatment of a waste gas. If the catalytic component is used in an amount exceeding the upper limit of the range, the cost of raw materials is high and the excess brings about no proportional addition to the effect. When the proportion of the carrier component is in the range mentioned above, the moldability of the catalyst is high and the ease of molding of the carrier in the shape of a honeycomb is high. Consequently, the catalyst enjoys ample lasting stability and highly satisfactory activity.

The catalyst of this invention can be produced by the following methods, which are of course illustrative and not limitative of this invention. The catalyst can be obtained by molding, drying, and calcining the powder of the carrier component thereby preparing a catalyst carrier, depositing the catalyst component in the form of a metal salt solution on the catalyst carrier by the technique of impregnation, and calcining the impregnated catalyst carrier. The catalyst can be otherwise obtained by preparing an aqueous solution containing such active elements of the catalyst component as a transition metal and a noble metal, thoroughly mixing this aqueous solution with the powder of the carrier component, directly molding the resultant mixture, and thereafter calcining the molded mixture.

Now, the methods for the production of the carrier and the catalyst of this invention will be described more specifically below.

In the preparation of the carrier containing the composite oxide of titanium and zirconium possessing the crystalline structure of $ZrTiO_4$, the titanium source can be selected from among such inorganic titanium compounds as titanium chloride, titanium sulfate, and titanic acids and such organic titanium compounds as titanium oxalate and tetraisopropyl titanate and the zirconium source can be selected from among such inorganic zirconium compounds as zirconium oxychloride, zirconium nitrate, and zirconium sulfate and such organic zirconium compounds as zirconium oxalate.

The following methods may be cited as preferable ways of preparing the carrier.

(1) A method which comprises mixing titanium tetrachloride with zirconium oxychloride, adding ammonia to the resultant mixture thereby giving rise to a precipitate, washing and drying the precipitate, and heating the dried precipitate at a temperature in the range of 600° to 1,000° C., preferably 660° to 900° C.

(2) A method which comprises adding zirconyl nitrate to titanium tetrachloride, subjecting the mixture to thermal hydrolysis thereby giving rise to a precipitate, washing and drying the precipitate, and heating the dried precipitate at a temperature in the range of 600° to 1,000° C., preferably 660° to 900° C.

(3) A method which comprises adding zirconyl nitrate to titanic acid, thermally decomposing the resultant mixture, and heating the product of the thermal decomposition at a temperature in the range of 600° to 1,000° C., preferably 660° to 900° C.

The method of (1) is more preferable than any of the other preferable methods cited above. Specifically, this method is carried out as follows. Compounds as a titanium source and a zirconium source are weighed out in amounts calculated to give $TiO_2$ and $ZrO_2$ contents in a prescribed molar ratio and a retained in the form of an acidic aqueous solution containing titanium and zirconium as oxides in a concentration in the range of 1 to 100 g/liter at a temperature in the range of 10° to 100° C. The hot aqueous solution is kept stirred and aqueous ammonia solution is added dropwise thereto as a neutralizing agent and they are left standing stirred at a pH value in the range of 5 to 10 for a period of ten minutes to three hours to give rise to a coprecipitated compound comprising titanium and zirconium. The coprecipitate is separated by filtration, thoroughly washed, then dried at a temperature in the range of 80° to 140° C. for a period in the range of one to 10 hours, and heated at a temperature in the range of 600° to 1,000° C., preferably 660° to 900° C. for a period in the range of 0.5 to 10 hours.

A complete catalyst is obtained by the following method, using the carrier prepared by the method described above and containing the composite compound of titanium and zirconium possessing the crystalline structure of $ZrTiO_4$ (hereinafter referred to as "$TiO_2$—$ZrO_2$"). The $TiO_2$—$ZrO_2$ powder and a molding auxiliary are mixed and blended with a suitable amount of water. The resultant mixture is molded in the form of beads, pellets, a plate, or a honeycomb by the use of an extrusion molding machine.

The catalyst can be obtained by drying the molded mixture at a temperature in the range of 50° to 120° C. and calcining the dried mixture at a temperature in the range of 300° to 800° C., preferably 350° to 600° C., for a period in the range of 1 to 10 hours, preferably 2 to 6 hours under a current of air.

The starting materials which are usable for the catalyst component include oxides, hydroxides, inorganic oxides, and organic acid salts, for example. The starting material is suitably selected from among ammonium salts, oxalates, nitrates, and sulfates, for example.

The conversion of the $TiO_2$—$ZrO_2$ into the catalyst by the addition thereto of manganese, iron, nickel, chromium, vanadium, molybdenum, cobalt, tungsten, cerium, copper, silver, gold, platinum, palladium, rhodium, ruthenium, and/or iridium can be effected by impregnating the molded mass of $TiO_2$—$ZrO_2$ with an aqueous solution of the salt of the aforementioned metal thereby depositing the metal salt on the molded mass and then drying and firing the resultant composite mass.

Otherwise, this conversion may be accomplished by a method which comprises adding the aqueous solution of the aforementioned metal salt in conjunction with the molding auxiliary to the $TiO_2$—$ZrO_2$ powder, kneading the resultant mixture, and molding it.

Further, a method for preparation of a catalyst by impregnating the $TiO_2$—$ZrO_2$ powder with an aqueous solution of the above-mentioned metal salt, drying and calcining to obtain catalyst powder, slurring the powder, and depositing the slurry a shaped body such as α-alumina, mullite, etc.

The catalyst produced by this invention is used for treating waste gases having hydrocarbons, sulfur oxides, and other similar oxidizing substances as principal components for treatment such as, for example, organic solvent type waste gases issuing from coating and resin processing plants, odorous waste gases emanating from refuse incinerating furnaces and scrap preheating furnaces, and organic type plant waste gases generated from petrochemical plants and waste gases having nitrogen oxides (mainly NO) and other similar reducible substances as principal components for treatment such as, for example, waste gas from boilers.

The temperature of the treatment is in the range of 150° to 800° C., preferably 200° to 700° C., the space velocity in the range of 1,000 to 200,000 $hr^{-1}$, preferably 3,000 to 100,000 $hr^{-1}$, and the pressure in the range of 0.01 to 10 $kg/cm^2$, though not strictly limited.

Though the composition of the reducible substance-containing waste gas subjected to the treatment using the catalyst of this invention is not strictly defined, it may comprise, for example 10 to 3,000 ppm of $SO_x$, 1 to 20% by volume of oxygen, 1 to 15% by volume of carbon dioxide, 5 to 20% by volume of water, 0 to 30 $g/Nm^3$ of dust, and 50 to 1,000 ppm of nitrogen oxides (mainly NO). The waste gas of this kind falls in the category of the ordinary boiler waste gas. The composition of the waste gas need not be strictly defined. The catalyst of this invention is capable of effectively treating even nitrogen oxide-containing waste gases not containing $SO_x$ and nitrogen oxide-containing waste gases containing halogen compounds, for example.

Though the conditions of the treatment are variable with the kind and behavior of the waste gas under treatment, the amount of ammonia ($NH_3$) to be added is preferable to be in the range of 0.5 to 3 parts by volume per part by volume of nitrogen oxides. In the case of the composition of the waste gas from boiler, for example, since NO accounts for the greater portion of nitrogen oxides, the molar ratio of NO:$NH_3$ is desired to be in the neighborhood of 1:1. This is because an excess of $NH_3$ demands attention to be paid to preventing the unaltered $NH_3$ from being discharged into the ambient air. Where the occurrence of the unaltered $NH_3$ must be suppressed by all means, the ammonia is desired to be used so that the molar ratio of $NH_3$ to NO is not more than 1. The reaction temperature is preferable to be in the range of 150° to 800° C., preferably 200° to 700° C., and the spatial velocity in the range of 1,000 to 100,000 hr$^{-1}$, preferably 3,000 to 30,000 hr$^{-1}$. Though the pressure is not strictly defined, it is preferable to be in the range of 0.01 to 10 kg/cm$^2$.

Now, the present invention will be described more specifically below with reference to working examples and controls. It should be noted, however, that this invention is not limited to these examples.

EXAMPLE 1

A binary composite oxide of titanium and zirconium (hereinafter referred to as "TZ") was prepared by the following method. As a titanium source, an aqueous sulfuric acid solution of titanyl sulfate of the following composition was used.

| | |
|---|---|
| TiOSO$_4$ (as TiO$_2$) | 250 g/liter |
| Whole H$_2$SO$_4$ | 1,100 g/liter |

A solution of 27.7 kg of zirconium oxychloride (ZrOCl$_2$.8H$_2$O) in 500 liters of water was added to 64 liters of the aqueous sulfuric acid solution of titanyl sulfate of the composition mentioned above and vigorously mixed. The resultant mixture was kept at about 30° C. and simultaneously stirred vigorously and aqua ammonia was gradually added thereto dropwise until pH 7 to induce occurrence of a coprecipitated gel. The reaction solution containing the coprecipitated gel was left standing at rest for 15 hours. Then, the gel was separated by filtration, washed with water, dried at 200° C. for 10 hours, and thereafter calcined in the atmosphere of air at 720° C. for three hours. The powder consequently obtained (hereinafter referred to as "TZ-1") had a composition of TiO$_2$:ZrO$_2$=7:3 (molar ratio) and a BET specific surface area of 30 m$^2$/g. The X-ray diffraction of this powder showed a peak indicative of a crystalline structure of ZrTiO$_4$.

In a kneader, 9.5 liters of water, 20 kg of the aforementioned powder, and 800 g of starch were thoroughly kneaded. The resultant mixture was extrusion molded in the shape of a honeycomb having a bore diameter (equivalent diameter of perforations) of 4 mm and an opening ratio of 70%. The honeycomb was dried at 120° C. for six hours and then fired at 450° C. for six hours.

The molded mass thus obtained was immersed in an aqueous palladium chloride solution, dried at 120° C. for six hours, and then fired at 400° C. for three hours, to obtain a catalyst containing 0.8% by weight of Pd.

EXAMPLE 2

A coprecipitated gel was formed by following the procedure of Example 1, except that an aqueous titanium tetrachloride solution was used as a titanium source and zirconyl nitrate as a zirconium source instead. The gel was separated by filtration, washed with water, dried at 200° C. for 10 hours, and then calcined in the atmosphere of air at 680° C. for five hours. The powder consequently obtained (hereinafter referred to as "TZ-2") had a composition of TiO$_2$:ZrO$_2$=5:5 (molar ratio) and a BET specific surface area of 40 m$^2$/g. The X-ray diffraction of this powder showed a peak indicative of a crystalline structure of ZrTiO$_4$.

In a kneader, 7.5 liters of water, 17 kg of the aforementioned TZ-2 powder, 3 kg of manganese dioxide powder, and 700 g of starch were thoroughly kneaded. The resultant mixture was extrusion molded in the shape of a honeycomb having a bore diameter (equivalent diameter of perforations) of 7 mm and an opening ratio of 77%. The honeycomb was dried at 120° C. for six hours and then calcined at 450° C. for six hours.

The catalyst thus obtained had a composition of MnO$_2$ (15% by weight) and TZ-2 (85% by weight).

EXAMPLE 3

In a kneader, 11 kg of zirconyl nitrate [ZrO(NO$_3$)2.2-H$_2$O] dissolved in 40 liters of water and 124 kg of titanium hydroxide cake (a content of 15% by weight as titanium oxide) added thereto were thoroughly mixed and simultaneously heated. The resultant mixture was dried and then calcined at 770° C. for three hours. The powder consequently obtained (hereinafter referred to as "TZ-3") had a composition of TiO$_2$:ZrO$_2$=85:15 (molar ratio) and a BET specific surface area of 15 m$^2$/g. The X-ray diffraction of this powder showed a peak indicative of a crystalline structure of ZrTiO$_4$.

A honeycomb-shaped catalyst containing 0.1% by weight of Pt and having a bore diameter (equivalent diameter of perforations) and an opening ratio of 73% was obtained by following the procedure of Example 1, except that the TZ-3 powder and platinic chloride were used instead.

CONTROL 1

A powder having a composition of TiO$_2$:ZrO$_2$=7:3 (molar ratio) and a BET specific surface area of 110 m/g was obtained by following the procedure of Example 1, except that the calcination of the powder was performed at 500° C. for five hours. The X-ray diffraction of this powder did not show a peak indicative of the crystalline structure of ZrTiO$_4$. A catalyst containing 0.8% by weight of Pd and having the same shape as that of Example 1 was obtained by following the procedure of Example 1, except that the powder mentioned above was used instead.

CONTROL 2

A catalyst containing 0.8% by weight of Pd and having the same shape as that of Example 1 was obtained by following the procedure of Example 1, except that activated alumina powder having a BET specific surface area of 120 m$^2$/g was used instead.

EXAMPLE 4

The catalysts of Examples 1 to 3 and Controls 1 and 2 were tested for catalytic activity by the following method. From each of the catalysts, a rectangular bar 40-mm square in cross section and 500 mm in length was cut in the direction of extrusion molding. This rectangular bar was placed in a reaction tube of stainless steel 50 mm square in cross section. In an electric furnace, this reaction tube was heated to 250° C. and a synthetic gas of the following composition was introduced into the catalyst bed at a space velocity of 20,000 hr$^{-1}$ to determine complete oxidation ratios of carbon monoxide (CO) and hydrocarbons (HC) at the outset of the introduction and after 8,000 hours' continued introduction of the synthetic gas. The rectangular was also tested for change in strength to determine the strength at breakage under pressure in the axial direction at the outset of the introduction and after the continued introduction (strength after continued introduction/initial strength). The results are shown in Table 1.

Composition of Synthetic Gas

| Propylene | 1,000 ppm |
| --- | --- |
| $SO_2$ | 500 ppm |
| CO | 1.5% by volume |
| $O_2$ | 15% by volume |
| $CO_2$ | 10% by volume |
| $H_2O$ | 10% by volume |
| $N_2$ | balance |

TABLE 1

| Catalyst | Complete oxidation ratio of CO (%) | | Complete oxidation ratio of HC (%) | | Ratio of change in catalyst strength after 8,000 hr/ start ratio |
| --- | --- | --- | --- | --- | --- |
| | start | after 8,000 hr | start | after 8,000 hr | |
| Example 1 | 100 | 100 | 100 | 100 | 1.0 |
| Example 2 | 100 | 100 | 100 | 100 | 1.0 |
| Example 3 | 100 | 100 | 100 | 100 | 1.0 |
| Control 1 | 100 | 0 | 100 | 0 | 0.7 |
| Control 2 | 100 | 0 | 100 | 0 | 0.5 |

EXAMPLE 5

A powder (TZ-4) having a composition of $TiO_2$:$ZrO_2$=8:2 (molar ratio) and a BET specific surface area of 40 m$^2$/g was obtained by a similar procedure of Example 1. The X-ray diffraction of this powder showed a peak indicative of a crystalline structure of $ZrTiO_4$.

A homogeneous solution was obtained by mixing 0.7 liter of monoethanolamine with 7 liters of water, dissolving 1.59 kg of ammonium paratungstate therein, and then dissolving 0.125 kg of ammonium metavanadate therein. In a kneader, this solution was vigorously mixed with a mixture containing 18 kg of the TZ-4 and 700 g of starch in the presence of a suitable amount of water. The resultant mixture was extrusion molded in the shape of a honeycomb having a bore diameter (equivalent diameter of perforations) of 4 mm and an opening ratio of 70%. This honeycomb was dried at 120° C. for six hours and then calcined at 450° C. for six hours. The composition of the catalyst consequently obtained was [TZ-4]:$V_2O_3$:$WO_3$=92.5:0.5:7 in a weight ratio of oxides.

EXAMPLE 6

In a kneader, 8.5 liters of water, 20 kg of the TZ-2 powder obtained in Example 2, and 800 g of starch were thoroughly mixed. The resultant mixture was extrusion molded in the shape of a honeycomb having a bore diameter (equivalent diameter of perforations) of 3 mm and an opening ratio of 72%. This honeycomb was dried at 120° C. for six hours and then calcined at 450° C. for six hours.

The shaped mass thus obtained was immersed in an aqueous tungstic acid solution, dried at 120° C. for six hours, and then calcined at 400° C. for six hours, to obtain a catalyst having a composition of [TZ-2]:$WO_3$=95:5 in a weight ratio of oxides.

CONTROL 3

A powder having a composition of $TiO_2$:$ZrO_2$=8:2 (molar ratio) and a BET specific surface area of 140 m$^2$/g was obtained by following the procedure of Example 5, except that the calcination of the powder was performed at 500° C. for five hours. The X-ray diffraction of this powder did not show a peak indicative of a crystalline structure of $ZrTiO_4$. A catalyst having the same shape as that of Example 5 was obtained by the following the procedure of Example 1, except that the powder mentioned above was used instead.

CONTROL 4

A catalyst was prepared by following the procedure of Example 6, except that a commercially available anatase type $TiO_2$ powder was used instead. The catalyst consequently obtained had a BET specific surface area of 60 m$^2$/g.

EXAMPLE 7

The catalysts of Examples 5 and 6 and Controls 3 and 4 were tested for catalytic activity by the following method. From each of the catalysts, a rectangular bar 25-mm square in cross section and 500 mm in length was cut. This rectangular bar was placed in a reaction tube of stainless steel. In an electric furnace, this reaction tube was heated to 420° C. and a synthetic gas of the following composition was introduced into the catalyst bed at a spatial velocity of 8,000 hr$^{-1}$ to determine the ratios of removal of nitrogen oxides at the outset of the introduction and after 4,000 hours' continued introduction. The rectangular bar was also tested for change in strength of catalyst by determining the strength at breakage under pressure in the axial direction of catalyst (strength after the continued introduction/initial strength). The results were as shown in Table 2.

Composition of Synthetic Gas

| Composition of synthetic gas | |
| --- | --- |
| NO | 200 ppm |
| $NH_3$ | 200 ppm |
| $SO_2$ | 10 ppm |
| $O_2$ | 15% by volume |
| $CO_2$ | 10% by volume |
| $H_2O$ | 10% by volume |
| $N_2$ | balance |

Ratio of removal of nitrogen oxides (%) =
$$1 - \frac{\text{Concentration of nitrogen oxides at outlet}}{\text{Concentration of nitrogen oxides at inlet}} \times 100$$

TABLE 2

| Catalyst | Removal ratio of Nox (%) | | Ratio of change in catalyst strength after 4,000 hr/ start ratio |
| --- | --- | --- | --- |
| | start | after 4,000 hr | |
| Example 5 | 98 | 98 | 1.1 |
| Example 6 | 95 | 95 | 1.0 |
| Control 3 | 98 | 65 | 0.2 |
| Control 4 | 96 | 51 | 0.3 |

EXAMPLE 8

In a kneader, 8.5 liters of water, 20 kg of the TZ-1 powder obtained in Example 1, and 400 g of starch were thoroughly mixed. The resultant mixture was extrusion molded in the shape of a cylindrical pellet having a diameter of 5 mm and a length of 6 mm. This pellet was dried at 120° C. for six hours and then calcined at 450° C. for six hours. Platinum was deposited on the pellet and calcined at 450° C. for four hours to obtain a catalyst containing 0.2% by weight of platinum.

EXAMPLE 9

A powder containing 1.5% by weight of platinum was obtained by impregnating the TZ-1 powder obtained in Example 1 with platinic chloride mixing thoroughly, drying at 120° C. for three hours and calcining at 450° C. for four hours. Into the platinum-containing powder, water was added to slurry by using a ball mill. The resultant slurry was impregnated with a commercially available spherical mullite carrier having 5 mm of diameter to obtain a pellet catalyst having 0.1 mm thickness of the catalyst layer on the surface.

EXAMPLE 10

The catalyst obtained in Examples 8 and 9 were respectively packed into a stainless steel reactor tube having 25 mm of an inner diameter in 100 mm of height, and an exhaust gas from phthalic anhydride production plant having the following composition was introduced into the tube at a temperature of 250° C. and a space velocity of 30,000 $hr^{-1}$. Complete oxidation ratio of CO and hydrocarbon (HC) at starting and after 8,000 hours were shown in Table 3.

Exhaust gas composition of phthalic anhydride plant

| CO | 5,000 ppm |
| Maleic anhydride | 700 ppm |
| Phthalic anhydride | 100 ppm |
| Aldehydes | 400 ppm |
| $SO_2$ | 200 ppm |
| $O_2$ | 15% by volume |
| $H_2O$ | 5% by volume |
| $N_2$ | balance |

TABLE 3

| Catalyst | Complete oxidation ratio of CO (%) | | Complete oxidation ratio of HC (%) | |
| --- | --- | --- | --- | --- |
| | Start | after 8,000 Hr | Start | after 8,000 Hr |
| Example 8 | 99 | 99 | 99 | 99 |
| Example 9 | 99 | 99 | 99 | 99 |

CONTROL 5

A platinum supported catalyst was obtained in a procedure of Example 8, except that an alumina carrier was used instead of the cylindrical pellet of the TZ-1. Catalytic test was carried out using the catalyst by a similar method of Example 10, but the catalyst decreased the activity based on the decrease of a specific surface area, so it was not able to use continuously.

What is claimed is:

1. A method for the production of a carrier for waste gas treating catalyst which comprises heat-treating a substance containing a titanium compound and a zirconium compound at a temperature in the range of 660° to 1,000° C. thereby giving rise to a composite oxide of titanium and zirconium possessing a crystalline structure of $ZrTiO_4$, preparing a powder containing said composite oxide, and molding said powder in the shape of a unitary structure possessing a plurality of through holes.

2. A method according to claim 1, wherein said substance containing a titanium compound and a zirconium compound is formed by a process of coprecipitation.

3. A method according to claim 1, wherein said through holes possess an equivalent diameter in the range of 1.5 to 12 mm and an opening ratio in the range of 60 to 90%.

4. A method for the production of a waste gas-treating catalyst, which comprises as a carrier component, heat-treating a substance containing a titanium compound and a zirconium compound at a temperature in the range of 660° to 1,000° C. thereby giving rise to a composite oxide of titanium and zirconium possessing a crystalline structure of $ZrTiO_4$, preparing a powder containing said composite oxide, molding said powder in the shape of a unitary structure possessing a plurality of holes and then depositing a catalytically active component deposited on said carrier, said catalytically active component being at least one metal selected from the group consisting of manganese, iron, chromium, vanadium, molybdenum, cerium, cobalt, nickel, tungsten, copper, silver, gold, platinum, palladium, rhodium, ruthenium, and iridium or a compound of said metal.

5. A method according to claim 4, wherein the content of said catalytically active component is in the range of 30 to 0.01% by weight as metal or compound and that of said carrier component in the range of 70 to 99.99% by weight.

6. A method according to claim 4, wherein said holes possess an equivalent diameter in the range of 1.5 to 12 mm and an opening ratio in the range of 60 to 90%, wherein said opening ratio is the ratio of the area of all holes to the area of sectional face including the holes and rigid area, which face is vertical to the gas flow.

7. A method according to claim 4, further comprising depositing said catalytic active component on said powder, said catalytic active component being composed of:
a) at least one element selected from the group consisting of manganese, iron, chromium, vanadium, molybdenum, cerium, cobalt, nickel, tungsten, copper and silver in the range of 0–30% by weight as compound; and
b) at least one element selected from the group consisting of gold, platinum, palladium, rhodium, ruthenium and iridium in the range of 0–10% by weight as metal; providing that the total amount of the elements is in the range of 30 to 0.01% by weight.

8. A method for the production of a waste gas-treating catalyst, which comprises, as a carrier component, heat-treating a substance containing a titanium compound and a zirconium compound at a temperature in the range of 660° to 1,000° C. thereby giving rise to a composite oxide of titanium and zirconium possessing a crystalline structure of $ZrTiO_4$, preparing a powder containing said composite oxide, molding said powder into a shape selected from the group consisting of pellets, beads, rings and saddles, and then depositing a catalytically active component deposited on said carrier, said catalytically active component being at least one metal selected from the group consisting of manganese, iron, chromium, vanadium, molybdenum, cerium, cobalt, nickel, tungsten, copper, silver, gold, platinum, palladium, rhodium, ruthenium, and iridium or a compound of said metal.

9. A method for the production of a waste gas-treating catalyst, which comprises:
a) preparing a powder containing composite oxide by heat-treating a substance containing a titanium compound and a zirconium compound at a temperature in the range of 660° to 1,000° C., thereby giving rise to a composite oxide titanium and zirconium possessing a crystalline structure of $ZrTiO_4$;

b) depositing a catalytically active component on said powder as a carrier component, said catalytically active component being at least one metal selected from the group consisting of manganese, iron, chromium, vanadium, molybdenum, cerium, cobalt, nickel, tungsten, copper, silver, gold, platinum, palladium, rhodium, ruthenium and iridium or a compound of said metal; and c) molding said powder in the shape of a unitary structure possessing a plurality of holes.

10. A method according to claim 9, wherein the content of said catalytically active component is in the range of 30 to 0.01% by weight as metal or compound and that of said carrier component in the range of 70 to 99.99% by weight.

11. A method according to claim 9, wherein said holes possess an equivalent diameter in the range of 1.5 to 12 mm and an opening ratio in the range of 60 to 90%, wherein said opening ratio is the ratio of the area of all holes to the area of sectional face including the holes and rigid area, which face is vertical to the gas flow.

12. A method according to claim 9, further comprising depositing said catalytically active component on said powder where said catalytic active component is composed of:

a) at least one element selected from the group consisting of manganese, iron, chromium, vanadium, molybdenum, cerium, cobalt, nickel, tungsten, copper and silver in the range of 0–30% by weight as compound; and b) at least one element selected from the group consisting of gold, platinum, palladium, rhodium, ruthenium and iridium in the range of 0–10% by weight as metal, providing that the total mount of the elements is in the range of 30 to 0.01% by weight.

13. A method for the production of a waste gas-treating catalyst, which comprises depositing a catalytically active component on a powder as a carrier component, which powder contains composite oxide and molding said powder into a shape selected from the group consisting of pellets, beads, rings and saddles, said catalytically active component being at least one metal selected from the group consisting of manganese, iron, chromium, vanadium, molybdenum, cerium, cobalt, nickel, tungsten, copper, silver, gold, platinum, palladium, rhodium, ruthenium, and iridium or a compound of said metal, and said powder being initially produced by heat-treating a substance containing a titanium compound and a zirconium compound at a temperature in the range of 660° to 1,000° C., thereby giving rise to a composite oxide titanium and zirconium possessing a crystalline structure of $ZrTiO_4$.

* * * * *